United States Patent

Lapins

[11] Patent Number: 5,566,909
[45] Date of Patent: Oct. 22, 1996

US005566909A

[54] SYSTEM AND METHOD FOR DEPLOYING MULTIPLE PROBES

[75] Inventor: Uldis E. Lapins, Rancho Palos Verdes, Calif.

[73] Assignee: Hughes Aircraft Company, Los Angeles, Calif.

[21] Appl. No.: 118,069

[22] Filed: Sep. 8, 1993

[51] Int. Cl.$^6$ ................................. B64G 1/22; B64F 1/04
[52] U.S. Cl. ............................. 244/158 R; 244/2; 244/63
[58] Field of Search ............................... 244/2, 158, 161, 244/63

[56] References Cited

U.S. PATENT DOCUMENTS

| | | | |
|---|---|---|---|
| 4,657,210 | 4/1987 | Hubert et al. | 244/158 R |
| 5,143,327 | 9/1992 | Martin | 244/158 R |
| 5,152,482 | 10/1992 | Perkins et al. | 244/158 R |
| 5,178,347 | 1/1993 | Johnson et al. | 244/158 R |
| 5,199,672 | 4/1993 | King et al. | 244/158 R |
| 5,217,188 | 6/1993 | Thole et al. | 244/63 |
| 5,245,927 | 9/1993 | Ranes | 244/2 |
| 5,271,582 | 12/1993 | Perkins et al. | 244/158 R |
| 5,299,764 | 4/1994 | Scott | 244/161 |

FOREIGN PATENT DOCUMENTS

| | | | |
|---|---|---|---|
| 5162696 | 6/1993 | Japan | 244/63 |
| 8908582 | 9/1989 | WIPO | 244/63 |

*Primary Examiner*—Andres Kashnikow
*Assistant Examiner*—Virna Lissi Mojica
*Attorney, Agent, or Firm*—Elizabeth E. Leitereg; Terje Gudmestad; Wanda K. Denson-Low

[57] ABSTRACT

Systems and methods that employ a spin-stabilized spacecraft in combination with a support and deployment module to carry a plurality of probes containing scientific instruments that are to enter a planet's atmosphere and/or are to be landed on a planet that is to be explored. The spacecraft functions as a probe carrier using the support and deployment module, and near the planet, it functions as an orbiting communications satellite that relays data and commands between the aerocraft and Earth. The support and deployment module secures the probes and is interposed between the spacecraft and the launch vehicle, and passes all structural loads due to the added mass of the aerocraft directly to the launch vehicle. The structural loads on the satellite are essentially the same as if the satellite was launched by itself with no added structure attached thereto. Therefore, existing spin-stabilized satellites may be used as probe carriers without structural redesign. In proximity to the planet, the spin axis of the spacecraft is oriented at a predetermined location on the surface of the planet, and multiple probes are deployed from the deployment module so that they will land at selected locations on the surface of the planet. Thereafter, the deployment module is jettisoned along a trajectory that will miss the planet, and a retrograde rocket is fired to inject the spacecraft into orbit around the planet. In this orbit, the spacecraft acts as a communication relay station between the scientific instruments on the surface of the planet and Earth.

7 Claims, 3 Drawing Sheets

Fig. 3

SYSTEM AND METHOD FOR DEPLOYING MULTIPLE PROBES

BACKGROUND

The present invention relates generally to scientific instrument deployment systems and methods, and more particularly, to systems and methods for deploying multiple probes containing scientific instruments into planetary atmospheres.

A number of unmanned missions have been carried out to Earth's moon and to other planets of our solar system. Most of these have involved a "fly-by" of a planet, or planets while making optical, photographic spectrographic, and magnetic observations, and the like, from the spacecraft. A few missions have shared a spacecraft in orbit around the planet. The Viking spacecraft was placed into orbit around Mars and then deployed a single probe to the surface. The Galileo spacecraft is planned to deploy a single probe and then be placed into orbit around Jupiter. However, no spacecraft has has heretofore been used to deploy a plurality of scientific packages (probes) to a plurality of selected locations on a planet's surface, and also served as an orbiting communication relay for the scientific probes.

Therefore, it is an objective of the present invention to provides for probe deployment systems and methods that employ a reliable spacecraft system to deploy multiple probes, specifically on deep space missions. It is a further objective of the present invention to provide for systems and methods for deploying a plurality of probes to a plurality of selected locations on a planet's surface, and provide an orbiting communication relay system for the deployed probes.

SUMMARY OF THE INVENTION

An objective of scientific exploration of other planets in our solar system is to gather scientific data related to planetary atmosphere, and/or other physical properties, and to do so at the lowest cost consistent with acceptable risk to the mission. The present invention accomplishes this objective in a way that utilizes a spin-stabilized spacecraft that has proved to be predictable and reliable in combination with a support and deployment module for carrying a plurality of probes or aerocraft containing scientific instruments or packages that enter the planetary atmosphere or are to be landed on the planet that is to be explored. In proximity to the planet, the spin axis of the spacecraft is oriented at a predetermined location on the surface of the planet, and the aerocraft or probe containing the scientific instruments are deployed in "frisbee-like-fashion" from the support and deployment module so that they will enter at selected locations in the planetary atmosphere. Thereafter, the support and deployment module is jettisoned along a trajectory that will miss the planet, and a retrograde rocket is fired to inject the spacecraft into orbit around the planet. In this orbit, the spacecraft provides a communication relay station between the scientific packages on the surface or the planet and Earth.

A further feature of the present invention is that it contemplates the use of two spacecraft each having a support and deployment module that each carry a plurality of aerocraft or probes containing scientific packages, and each having the capacity to serve as the orbiting communication relay for all of the scientific packages carried by both spacecraft. In this manner, full backup is provided for the functions of the orbiting communication relay station.

While the invention contemplates that both spacecraft may be launched from the Earth by a single launch vehicle, the preferred embodiment is to launch each spacecraft on a separate launch vehicle, launched several days apart. This allows the use of two smaller, less expensive launch vehicles, rather than one larger more expensive launch vehicle, which provides a greater margin for success, and allows re-use of the same launch crews and technical personnel to prepare and launch both spacecraft.

The present invention may use one or two spacecraft, such as a HS-376 spacecraft, for example, that each include the support and deployment module for deploying multiple probes on the mission. The HS-376 satellite is a time-tested and proven system and over 35 of these systems have been launched without failure and are currently operational. The support and deployment module secures the probes and is physically interposed between the spacecraft and the launch vehicle using standard mating collars. The support and deployment module is adapted to carry sixteen probes and simultaneously deploy two or more probes from a relatively long stand-off range (50 days journey) from the planet that is to be explored. In the case of two probes, they are released in diametrically opposed directions to provide for a mass-balanced release. Similarly, for more than two probes, the multiple probes are released such that the remaining mass on the support and deployment module is balanced.

The dual-purpose spacecraft is one key element of the present system. In the cruise phase of the mission, the spacecraft functions as a probe or aerocraft carrier using the support and deployment module, and near the planet, it functions as an orbiting communications satellite that relays data and commands between the aerocraft and Earth. A unique feature that enables a simple implementation of both functions with minimal impact on the satellite is the concept and design of the support and deployment module. The support and deployment module passes all structural loads due to the added mass of the aerocraft directly into the launch vehicle, which is nominally designed for the total launch mass, and does not impose any structural loads on the satellite. The structural loads on the satellite are essentially the same as if the satellite was launched by itself with no support and deployment module or aerocraft attached thereto. Therefore, existing spin-stabilized satellites may be readily adapted as aerocraft carriers with no structural redesign.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
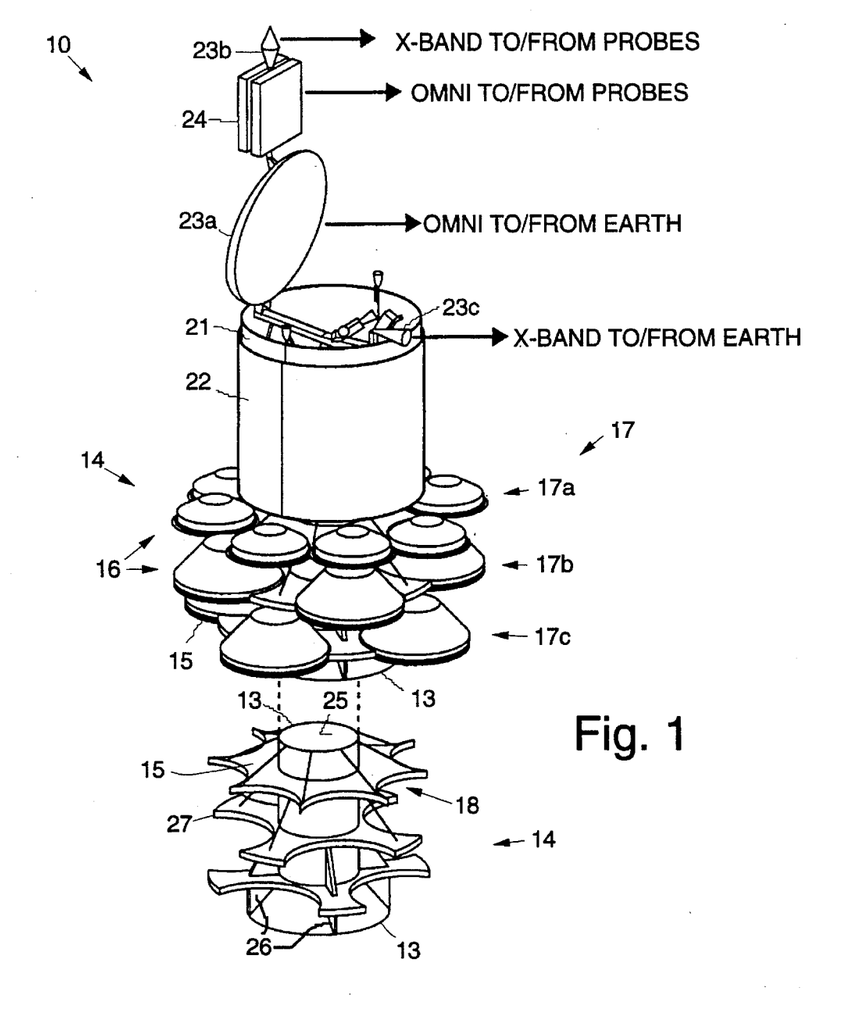
FIG. 1 illustrates an embodiment of a first system for deploying probes in accordance with the principles of the present invention.
Figure 2:
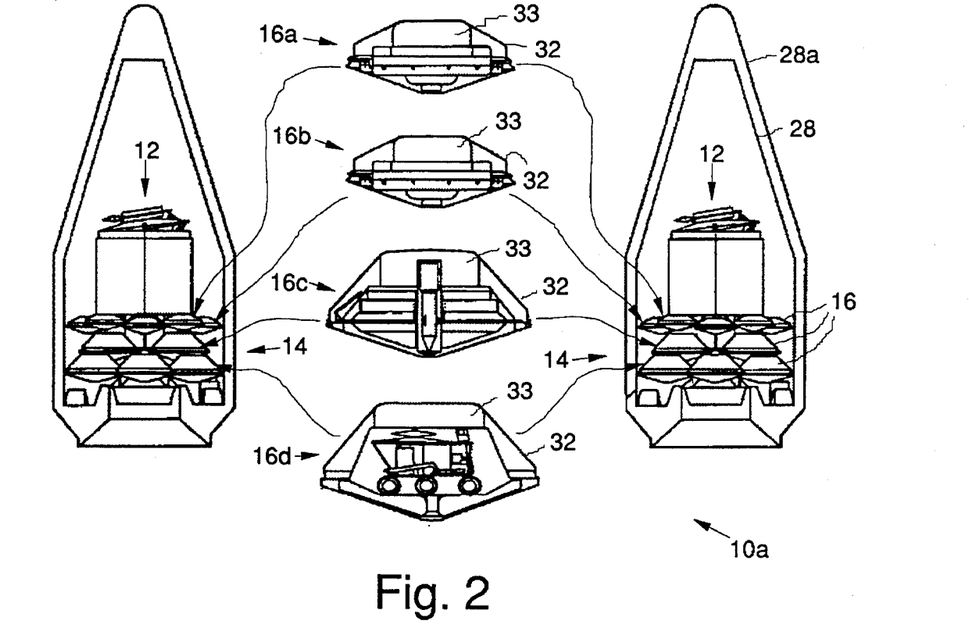
FIG. 2 illustrates an embodiment of a second system for deploying probes in accordance with the principles of the present invention.
Figure 3:
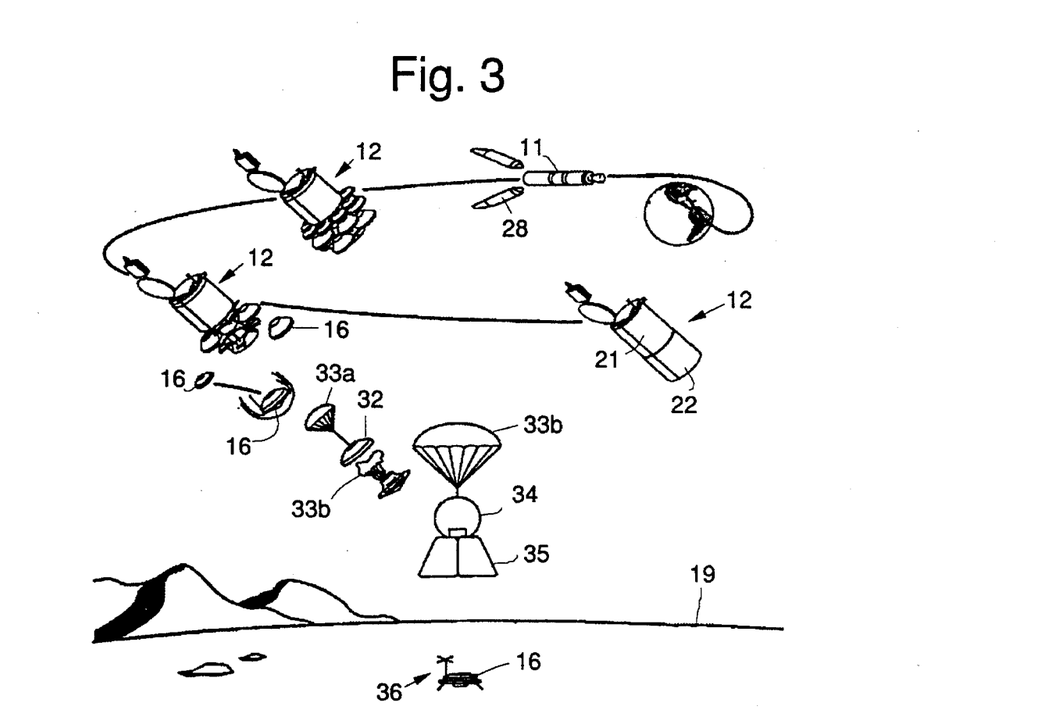
FIG. 3 is a schematic overview illustrating a deep space mission on which the systems and method for deploying multiple probes in accordance with the principles of the present invention are employed.

Referring to the drawing figures, FIGS. 1 and 2 illustrate two embodiments of systems 10, 10a for deploying probes 16 in accordance with the principles of the present invention. FIG. 3 is a schematic overview illustrating a deep space mission on which the systems 10, 10a and method 40 for deploying multiple probes 16 in accordance with the principles of the present invention are employed. Reference will be made to each of these drawing figures as required to explain the present invention.

Referring to FIG. 1, the system 10 is comprised of a launch vehicle 11, such as an Atlas IIAS rocket, for example, a portion of which is shown in FIG. 1, and which is adapted to carry a spin stabilized spacecraft 12 or spin stabilized satellite 12, such as a HS-376 satellite manufactured by the assignee of the present invention, for example. In a conventional satellite launch scenario, the satellite 12 is mated to the launch vehicle 11 by means of a set of mating collars 13. In the present system 10, a support and deployment module 14 or mechanism 14 in accordance with the principles of the present invention is interposed between the launch vehicle 11 and the satellite 12 and includes a set of mating collars 13 that mate with corresponding ones of the collars 13 on the satellite 12 and the launch vehicle 11.

The support and deployment module 14 is comprised of a frame 15 or support structure and pyrotechnic separation clamps (not shown, but generally indicate at 18) that hold probes 16 in place thereon. Sixteen probes 16, or aerocraft 16, that are arranged in three layers 17a, 17b, 17c. Eight smaller probes 16 are disposed in an upper-most layer 17a, while four larger probes 16 are each disposed in middle and lower-most layers 17b, 17c in an offset manner. Each of the probes 16 are held in the frame 15 by the separation clamps 18 that are controllably exploded to release the probes 16 at a predetermined time. The detonation of the separation clamps 18 and accompanying release of the probes 16 is controlled in a generally well-known manner using a computer (not shown) disposed on the satellite 12. The bottom portion of FIG. 1 shows the frame 15 after jettison of all of the probes 16. Its mating collars 13 are shown that are adapted to couple it to the satellite 12 and to the launch vehicle 11.

The satellite 12 is comprised of inner and outer solar panels 21, 22. The outer solar panel 22 is adapted to slide downward into the space occupied by the support and deployment module 14 once the frame 15 is jettisoned. This is shown more clearly in FIG. 3. The satellite 12 is also comprised of a plurality of X-band and UHF antennas 23a, 23b, 23c, 24 that are used to communicate with an Earth station (not shown) and with each of the probes 16 after deployment.

The support and deployment module 14 includes a central thrust tube 25 connected to the launch vehicle 11 at one end and to the spacecraft 12 at the other. The support and deployment module 14, provides the structural interconnection between the satellite 12, the aerocraft 16, and the launch vehicle 11. The cylindrical thrust tube 25 stiffened by four vertical longerons 26 running its length, three honeycomb horizontal shelves 27 that support the mass of the aerocraft 16, supports the satellite 12, and contains electrical harnesses (not shown) that distribute signals to provide command and data handling transactions for the aerocraft 16 and power needed to charge batteries, control thermal conditions, and initiate deployment of the aerocraft 16, using the separation clamps 18.

The satellite 12 and the support and deployment module 14 are enclosed in a bioshield 28 (shown in FIGS. 2 and 3) that protects the aerocraft 16 from a fairing 28a of the launch vehicle 11 and from generated microbial contamination. The support and deployment module 14 is fabricated from a fiber reinforced plastic material and has integral longerons 26 and circumferential hoops. Immediately prior to separation of the spacecraft 12 from the launch vehicle 11, the bioshield 28 is opened at its forward end. Upon release, the weightless environment of space combined with the increased differential pressure provided by space vacuum on pneumatic cavities in the bioshield 28, causes the bioshield 28 to have an erect, self-standing and open-ended configuration (shown clearly in FIG. 3)having adequate clearance for the unobstructed separation of the spacecraft 12 and support and deployment module 14 from the launch vehicle 11. Only a forward attachment ring of the bioshield 28 remains installed on the support and deployment module 14 as the spacecraft 12 separates from the launch vehicle 11. The erect bioshield 28 remains attached to the launch vehicle 11.

FIG. 2 illustrates a second embodiment of the present system 10a in accordance with the principles of the present invention. The second embodiment of the system 10a includes two satellites 12 and accompanying support and deployment modules 14 that are disposed on top of the launch vehicle 11. The two satellite 12 are housed within separate bioshields 28 that protect each satellite 12 and its probes 16 during launch. Also shown in FIG. 2 are four different types of probes 16 that may be carded by the support and deployment module 14. These probes 16 include different scientific packages such as a meteorology package 31a, a minimeteorology package 31b, a seismology package 31c, and a geoscience package 31d. The meteorology and minimeteorology probes 16a, 16b comprise smaller-size probes 16 while the seismology and geoscience probes 16c, 16d comprise larger-size probes 16. Each probe 16 includes a heat shield 32 that is employed to protect the probe 16 from the entry heat load, a parachute and balloon assembly 33 comprising pilot and main parachutes 33a, 33b and a balloon 34, and an airbag 35 (shown in FIG. 3) that are used to assist the probe 16 in its descent to the surface of the planet 19.

FIG. 3 is a schematic overview illustrating a deep space mission on which the systems (10, 10a) and method 40 for deploying multiple probes 16 in accordance with the principles of the present invention are employed, such as those systems (10, 10a) described with reference to FIGS. 1 and 2 above. The system 10 is comprised of the launch vehicle 11 which is adapted to carry the spin stabilized satellite 12. In the present system 10, the support and deployment module 14 is disposed between the launch vehicle 11 and the satellite 12. The launch vehicle 11 includes the bioshield 28 that covers the satellite 12 and deployment module 14 during launch and prior to separation of the spacecraft 12 and deployment module 14 from the launch vehicle 11.

FIG. 3 also illustrates the deployment method 40 in accordance with the present invention. FIG. 3 shows that the launch vehicle 11 has been launched from Earth and at a first point in its flight path the bioshield 28 is separated and ejected from the launch vehicle 11. At a next point shown during the flight, the satellite 12 is in a cruise mode wherein its antennas 23, 24 have been deployed and the probes 16 are ready for deployment. Once the satellite 12 and deployment module 14 have separated from the launch vehicle 11, they travel to a point that is a distance of about 50 day's journey from a planet 19 that is to be explored.

Once the satellite 12 reaches a first probe release position, a first pair of probes 16 are simultaneously released from the support and deployment module 14 by initiating the pyrotechnic devices 18 or the separation clamps (not shown). FIG. 3 shows the release of one pair of probes 16 in substantially opposite directions from the satellite 12. In accordance with the deployment method 40 of the present invention, the satellite 12 is oriented such that its spin axis is aligned at the center of a line along which the two probes 16 are to be landed. Then opposed pairs of probes 16 are simultaneously released from the deployment module 14 such that they descend toward the surface of the planet 19. Each of the probes 16 that are simultaneously released have the same mass, and therefore a controlled release of them on opposite directions from the support and deployment module 14 is achieved. Each released pair of probes 16 is selected from a specific layer 17 of the support and deployment module 14.

The two probes 16 descend into the atmosphere of the planet 19 and the parachutes 33 are deployed, and then the balloon 34 and the airbag 35 are deployed at a predetermined time after entry into the atmosphere of the planet 19. The two simultaneously released probes 16 thus land at desired locations on the surface of the planet 19 generally at opposite ends of the line extending between them and the point at which the spin axis of the satellite 12 intersects the surface of the planet 19. Accordingly, reasonably accurate deployment of the probes 16 is achievable. After release of the first pair of probes 16, the spacecraft 12 is retargeted by means of propulsive maneuvers using a propulsion system (not shown) of the spacecraft 12 to a new aim point. At a new predetermined time, the next pair of probes 16 is released. This procedure is repeated until all sixteen probes 16 have been released. The release concept and procedure for all probes releases is the same as for the initial pair of probes 16. Once all of the probes 16 on the support and deployment module 14 are released, it is jettisoned, and the satellite 12 is injected into orbit around the planet 19. The satellite then provides a communications relay station for communicating data from each of the probes 16 and Earth using the various antennas 23, 24 and associated communications links (X-band and UHF).

Figure 4:
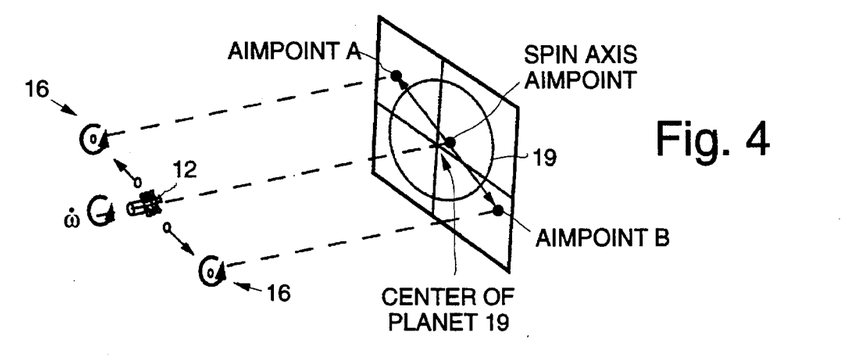
FIG. 4 illustrates the targeting and release of two probes in accordance with the principles of the present invention.

FIG. 4 illustrates the method 40 of targeting and release a selected pair of probes 16 in accordance with the principles of the present invention. In accordance with the deployment method 40 of the present invention, the satellite 12 is oriented such that its spin axis is aligned generally at a center of the line along which the two probes 16 are to be located. Then, opposed pairs of probes 16 that have substantially the same mass, and that are located on the same layer 17 of the support and deployment module 14, are simultaneously released therefrom such that they descend toward the surface of the planet 19. Since each of the probes 16 that are simultaneously released have the same mass, they are controllably jettisoned in diametrically opposed directions from the support and deployment module 14, and relatively accurate positioning off the probes 16 on the surface of the planet 19 is a result.

Figure 5:
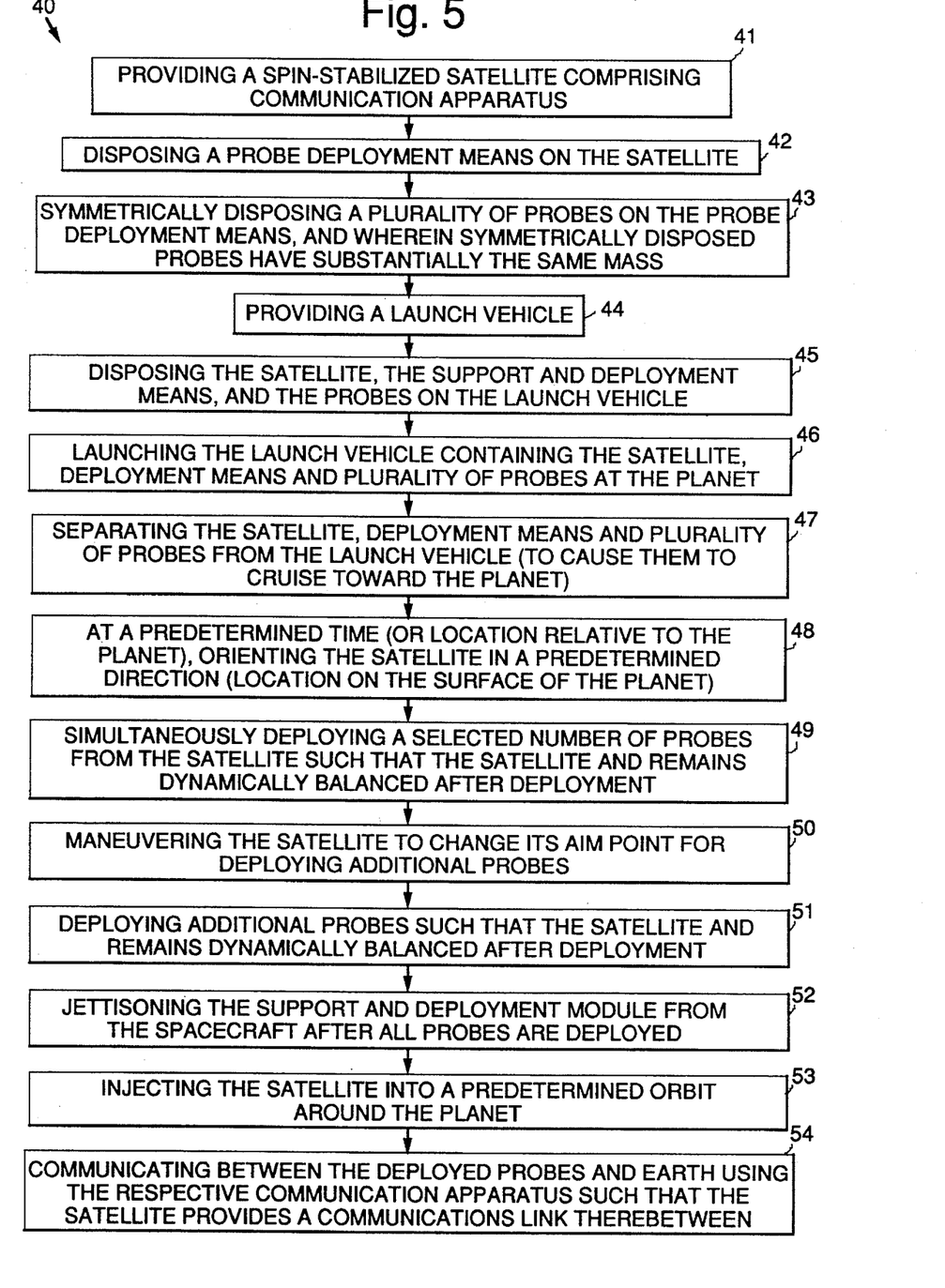
FIG. 5 is a flow chart illustrating the deployment method in accordance with the principles of the present invention.

For the purposes of completeness, FIG. 5 is a flow chart illustrating the deployment method 40 in accordance with the principles of the present invention. The deployment method 40 is comprised of the following steps. First a spin-stabilized satellite 12 suitable for interplanetary flight and for communications to and from an orbit about a planet 19 is provided, as illustrated in step 41. Then a support and deployment module 14 is provided and integrated with the satellite 12, as illustrated in step 42. Then, a complement of probes 16 (or aerocraft 16) containing scientific instruments and other appropriate electronics are provided and attached to the support and deployment module 14 with pyrotechnically activated separation clamps, as illustrated in step 43. Probes 16 are attached to the support and deployment module 14 at locations that maintain dynamic balance. A launch vehicle 11 is provided, as illustrated in step 44. Then, the satellite 12 with the support and deployment module 14 and probes 16 attached is integrated to the launch vehicle 11, as illustrated in step 45. Then the launch vehicle 11 containing the satellite 12, support and deployment module 14 and the plurality of probes 16 are launched toward a planet 19, as illustrated in step 46.

Then the satellite 12, the support and deployment module 14 and plurality of probes 16 are separated from the launch vehicle 11 to cause this assembly to cruise, toward the planet 19, for example, as illustrated in step 47. At a predetermined location relative to the planet 19, the spin-stabilized spacecraft 12 is oriented such that its spin axis is pointed at a desired aim point on the planet 19 that is along a line between the desired landing locations of the probes 16 when they land on the surface of the planet 19, as illustrated in step 48. In general, a selected number of probes 16 are simultaneously deployed from the support and deployment module 14, such that the satellite 12 and remains dynamically balanced after deployment, as illustrated in step 49. In a specific embodiment of the present invention, a selected pair of probes 16 are simultaneously deployed along opposite flight paths from the satellite 12 toward the surface of the planet 19, with each probe spinning in the same direction as the spin-stabilized spacecraft 12, and wherein the probes 16 are adapted to land at opposite ends of the line passing through the location at which the spin axis of the satellite 12 is pointed. Propulsive maneuvers with the satellite 12 are performed to change the aim point as needed for any new pair of probes 16, as is illustrated in step 50. Additional probes 16 are then deployed from the support and deployment module 14, such that the satellite 12 and remains dynamically balanced after deployment, as illustrated in step 51. Once all probes 16 are deployed from the spacecraft 12, the support and deployment module 14 is jettisoned from the spacecraft 12, as is illustrated in step 52. The satellite 12 is injected into a predetermined orbit around the planet 19, as is illustrated in step 53. The spacecraft 12 is then used as a communications relay station to provide communication between each of the probes 16 and the Earth using their respective communication apparatus 36, as illustrated in step 54.

A more detailed discussion of the aspects of the systems 10, 10a and method 40 of the present invention follows. One feature of the present systems 10, 10a is the partitioning of the science instruments in four separate packages carded on four separate kinds of aerocraft 16 that are disposed at respective locations of the three layers 17 of the support and deployment module 14. The systems 10, 10a provides for four types of relatively simple aerocraft 16 grouped by function, including seismology, geoscience, meteorology, and minimeteorology 16a–16d. Each spacecraft 12 may carry, for example, four of each of these four types of aerocraft 16, as is shown in FIG. 2. The present systems 10, 10a provide for accurate, timely deployment of the appropriate complement of scientific instruments to each of sixteen locations on the surface of the planet 19 from which both short-term and long-term observations of the atmosphere and surface of the planet 19 may be made.

The dual-purpose spacecraft 12 is a key element of the present system 10. In the cruise phase of the mission shown in FIG. 3, the spacecraft 12 functions as a probe carrier using the support and deployment module 14, and near the planet 19, it functions as an orbiting communications satellite 12 that relays data and commands between the aerocraft 16 and Earth. A unique feature that enables a simple implementation of both functions with minimal impact on the satellite 12 is the concept and design of the support and deployment module 14. The support and deployment module 14 passes all structural loads due to the added mass of the aerocraft 16 directly to the launch vehicle 11, which is designed (nominally) for the total launch mass, and does not impose any structural loads on the satellite 12. The structural loads on the satellite 12 are essentially the same as if the satellite 12 was launched by itself with no support and deployment module 14 or aerocraft 16 attached thereto. Therefore, existing spin-stabilized satellites 12 may be readily adapted as probe carriers with no structural redesign.

The aerocraft 16 are not free-flying elements. The spacecraft 12 functions as an aerocraft carrier in the cruise phase of the mission, and transports the aerocraft 16 to the vicinity of the planet 19. The preferred spacecraft 12 is the highly reliable, simple-to-operate, HS 376 dual-spin satellite 12 with communications apparatus that support deep space communications and includes the support and deployment module 14 that provides a structural and electrical interface between the spacecraft and aerocraft 16 during the launch and cruise phases. The communications apparatus on both the satellite 12 and the probes 16 employs conventional UHF and X-band communication links. Such communications apparatus is well known to those skilled in the art and these components will not be described in detail herein.

A distinct advantage of the systems 10, 10a of the present invention, as opposed to systems that use body-stabilized, three-axis controlled spacecraft, or free-flying aerocraft 16, are that they greatly simplify mission operations. Mission operations are simpler using spin-stabilized spacecraft 12 than they are with body-stabilized vehicles, and the number of vehicles that must be controlled is relatively small. A controlling Earth station communicates with and controls a maximum of two spacecraft 12 during the interplanetary cruise phase. More specifically, the controlling Earth station executes only three trajectory correction and seven aerocraft release targeting maneuvers with each spacecraft 12 that are required to target the spacecraft for planetary encounter after separation from the launch vehicle 11. In contrast, an architecture using of eight or sixteen free-flying aerocraft 16 requires the performance of three trajectory correction maneuvers per aerocraft 16 (as many as 48 total maneuvers), as opposed to the twenty required by the present invention.

Targeting and release of the aerocraft 12 are explained in more detail below. The spinning release implemented by the present system 10 and method 40 ensures stability of the aerocraft 16 during final approach and entry into the atmosphere of the planet 19. The tangential velocity of each aerocraft 16 in the deployed pair at its moment of release results in a physical separation between them on the surface of the planet 19. A simultaneous release of all sixteen aerocraft 16 cannot place them at desired locations on the surface. To overcome this problem, the present invention releases the aerocraft 16 in pairs from positions diametrically opposed to each other on the support and deployment module 14. The paired aerocraft 16 have substantially identical mass so that their deployment leaves the spacecraft 12, support and deployment module 14 and remaining aerocraft 16 with balanced mass about the spin axis of the spacecraft 12. Prior to each probe deployment, the attitude of the spin axis and the spin velocity or the spacecraft 12 are adjusted so that each pair of aerocraft 16 that are to be deployed are directed at the desired landing sites on the surface of the planet 19.

The simultaneously released pairs of aerocraft 16 fly in independent free flight of from 10 to 40 days duration to the preselected sites on the surface of the planet 19. Between aerocraft releases, the spacecraft 12 is retargeted toward additional pairs of landing sites. Several days are available between maneuvers to accurately determine orbit and attitude of the spacecraft 12 necessary for the next deployment.

It is to be understood the the present launching concept is not limited to the release of only two probes 16. As long as the spacecraft 12 remains dynamically balanced, any other combination of probes may be released from this specific module 14 (4, 6, 8, etc.), or if the aerocraft support module 14 is rearranged to carry nine probes per layer 17, for example, release of three (6 or 9) probes 16 at a time may be provided. This modification to the disclosed specific release procedure should be easily understood by those skilled in the art.

In the disclosed embodiments of the present invention, each spacecraft 12 may carry sixteen aerocraft 16 that each contain scientific instrument packages. These may comprise 4 surface science, 4 seismology, 4 meteorology, and 4 minimeteorology aerocraft 16 targeted to 8 specified sites. The eight different approach trajectories required to deposit aerocraft 16 at eight landing sites are the product of only four deployment and targeting sequences. At the moment of release from the spacecraft 12, each aerocraft 16 has, relative to the planet 19, a forward approach velocity of the spacecraft 12 and a tangential velocity proportional to the spin rate of the spacecraft 12. Since respective ones of the pair of aerocraft 16 are disposed exactly opposite each other on the spacecraft 12, their tangential velocities at release are in opposite directions. Releasing aerocraft pairs at a proper clock angle in the spin cycle and controlling the spin rate of the spacecraft 12 enables two separate sites to be targeted with the same trajectory while keeping the spacecraft 12 dynamically balanced.

After release of the first pair of aerocraft 16, the trajectory aim point of the spacecraft 12 is retargeted to the center of a new pair of sites, and the spin rate of the spacecraft 12 is adjusted to adequately shape the trajectories of the next two aerocraft 16 after release. A phasing maneuver that changes the magnitude of the velocity vector of the spacecraft in the direction of the planet 19 may be performed to adjust the time of arrival to that necessary to attain longitudes on the far side of the planet 19.

The present deployment scheme is flexible and allows more landing sites to be reached by deployment from one spacecraft 12. Reconfiguring the spacecraft 12 or introducing more landing sites would alter the deployment scenario herein described, but would not alter the ability to meet all targeting constraints or the rationale of the deployment scheme.

Aerocraft deceleration systems (parachutes 33, balloon 34, and airbag 35) have an identical design, but like the aerocraft 16, have different sizes. An aeroshell 32 having a 70 degree forebody cone angle may be used to protect the aerocraft 16 from the thermal environment encountered during entry. A two-piece clamp (not shown) holds the aeroshells 32 fixed to the spacecraft 12. A NASA standard initiator (the pyrotechnic mechanism 18) may be used to actuate a pin puller (not shown), allowing the clamp to open to release the aeroshell 32. A deployment spring (not shown) opens the clamp, with the spring force chosen to ensure that the free half of the clamp is accelerated away from the aerocraft 16 as the aerocraft's tangential velocity causes it to separate from the support and deployment module 14. Once the free half of the clamp has deployed, it separates from the spacecraft 12, thus preventing bounceback into the aerocraft 16. The velocity vector of the departing clamp half is directed roughly 90 away from that of the aerocraft 16 to preclude post-deployment interference.

The firing of the pyrotechnic mechanism 18 is chosen based on the desired targeting of the aerocraft 16 that are to be released. The operation of the pin-puller release of the clamp is a highly repeatable event, occurring in a window 20±2 ms from the instant an electrical impulse is received by the pyrotechnic mechanism 18. The pin-puller also provides an essentially shock-free release, so that forces imparted to departing aerocraft 16 by the release are negligible. The clamp provides contact between the support and deployment module 14 and the aerocraft 16 only at a single interface. The pin-puller release, acting in conjunction with the clamp deployment spring, frees that interface, providing an essentially friction-free, torque-free release of the aerocraft 16 from the support and deployment module 14.

Deceleration is sensed by g-switches that activate a processor on-board the aerocraft 16 and initiates a final sequence of events. The processor determines an optimum parachute deployment time for attaining the targeted site on the basis of stored information. This information may be updated through the spacecraft, by Earth station operators, before aerocraft release from the support and deployment module 14 if the target point or conditions change between the times of launch and release of the aerocraft 16. Before landing, the airbags 35 are deployed to cushion impact with the surface of the planet 19. A balloon-type airbag 34 located on top of the aerocraft 16 ensures that the aerocraft 16 remains upright after landing. Ejection of the parachute 33b and balloon 34 and deflation of the airbag 35 complete the landing sequence.

After instrument and other deployments are complete, each science instrument begins its mission, collecting, compressing (if required), and storing data in memory for later transmission to the spacecraft 12 that is adapted to function as an orbiting communications relay station. The orbiting satellite 12 operating as the communications relay station periodically overflies all scientific instrument packages, receives and stores scientific data transmitted to it by way of the UHF link, plays back and transmits data to the Earth station using the X-band link, and relays commands received via the X-band link from the Earth station to the scientific instrument packages using the UHF link.

After release of all aerocraft 16, the spacecraft 12 is retargeted to travel behind the planet 19 and to reach its point of closest approach to it, typically about 400 km from the surface. After confirmation of retargeting maneuver performance, the support and deployment module 14 is jettisoned and follows a hyperbolic trajectory to escape the planet's gravitational pull after passing by the planet 19.

The spin axis of the spacecraft 12 is reoriented for planetary orbit insertion burn with its aft end pointed along the velocity vector at periapsis. Planetary orbit insertion is performed out of view of the Earth by a pretimed firing of a rocket motor (not shown), a technique similar to with the Pioneer Venus orbiter. The spacecraft 12 is oriented in a highly inclined, elliptical communications orbit. Hydrazine thrusters (not shown) on the spacecraft 12 may be fired to adjust the orbit, as required, and to compensate for any deficiencies of solid motor performance and ephemeris errors.

In its communications orbit configuration, the spacecraft 12 operates as a conventional communications satellite 12. Its outer solar panel 22 is extended to provide full power for the X-band link that provides communication with the Earth through the high gain X-band antenna 23a. The highly inclined orbit of the spacecraft 12 ensures coverage of the entire surface of the planet 19, including both poles.

Each aerocraft deployment is separated by several days (10 days, for example) from the previous one to provide sufficient time for mission operations personnel to determine the correct orbit and analyze maneuvers, to compute the required spacecraft targeting velocity, and to verify that the velocity achieved. For example, 50 days from the planet 19, the spacecraft is reoriented to the release attitude along the approach velocity vector aimed between the first two target sites in preparation for the first release. There are 10 days to evaluate the results of these maneuvers, determine orbit, and recalculate the next maneuver and deployment sequence. The spacecraft 12 is then caused to release the next two aerocraft 16 forty days from the planet 19.

After deployment and retargeting commands are issued, pulsed radial thrusters (not shown) are fired, and the spin rate for the next deployment is adjusted. Ten days are available to evaluate these maneuvers on the basis of data from both the on-board accelerometers (not shown) and for the tracking network to command a trim burn if one is required. At a point 30 days from the planet 19, three pairs of aerocraft 16 targeted to two sites are deployed. The sequence continues, and another three pairs of aerocraft 16 are deployed 20 days from the planet 19, then one more pair 10 days from the planet 19.

The present system 10 allows the Earth station to control communications with a single spacecraft 12, operating as a communications orbiter. It thereby eliminates much of the expense of, and many of the technical complications involved in, communicating directly with 16 science stations. The repeating, predictable ground track of the communications satellite 12 also permits long-term scheduling of events.

Aerocraft deployment begins at about 50 days before encountering the planet 19. Commands reorient the spacecraft to the attitude required for first release. Ground controllers command targeting maneuvers, phasing maneuvers, and spin rate changes for each deployment. They then combine the accelerometer data, preprocessed on-board the spacecraft, with tracking data collected over a 10 day period to determine whether a realignment maneuver is required just prior to release and, if it is, its desired characteristics.

After its release, each aerocraft 16 flies passively to the planet 19. Since each aerocraft 16 is spin stabilized and has no propulsion or attitude control system, the Earth station only has to control the spacecraft, not multiple aerocraft 16. Each aerocraft 16 enters the planet's atmosphere, decelerates, then autonomously deploys the parachutes 32 to reduce its velocity for a safe landing. Execution of a set of preprogrammed commands deploys the instruments, antennas, and solar arrays of each landed science station contained within an aerocraft 16.

After all aerocraft 16 have been deployed, Earth station controllers command the jettisoning of the support and deployment module 14 and the reorientation of the spacecraft 12 for orbit insertion using an solid rocket motor on-board the spacecraft 12. Once the spacecraft 12 is in orbit, communication with the landed science stations flows through the spacecraft 12, operating as a orbiting communications relay station. The command and control functions of the spacecraft and Earth station are well known to those skilled in the art and will not be described in detail herein.

The present system 10 is adapted to release a pair of aerocraft 16 simultaneously targeted to two of the sixteen desired landing sites. The maneuver, execution, and release accuracy is consistent with the landing footprint of less than 150 km (3σ) down-track and 40 km (3σ) cross-track. Each spacecraft 12 carries 16 aerocraft 16 which are released two at a time with appropriate targeting maneuvers between consecutive releases. Partitioning the instrumentation into seismology, meteorology, and geoscience packages 16a–16d with individually targeted aerocraft 16, eliminates the need to compromise landing site selection for conflicting science instrument requirements allowing the selection of optimal sites for each science package. In so doing it affords an otherwise unobtainable flexibility in assigning aerocraft 16 to desirable locations in global networks of like science.

After releasing all aerocraft 16 the spacecraft 12 retargets its own trajectory for insertion into orbit. It jettisons the support and deployment module 14 which continues on a fly-by trajectory past periapsis at 400 km and onto escape from the gravitational field of the planet 19 (thus accomplishing planetary protections requirements). The spacecraft 12 fires its solid orbit insertion motor using a stored command to insert itself into a critically inclined orbit and prepares to begin operation as a communications orbiter.

Thus there has been described a new and improved systems and method for deploying multiple probes containing scientific instruments on deep space missions. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A system for deploying multiple probes, said system comprising:

a launch vehicle;

a spin stabilized communications satellite;

probe carrying means disposed between the satellite and the launch vehicle;

a plurality of probes disposed on the probe carrying means, wherein symmetrically disposed probes have substantially the same mass;

separation means coupled to the probe carrying means for seperating the satellite, the probe carrying means and the plurality of probes from the launch vehicle;

targeting means for orienting the spin axis of the satellite in a predetermined direction;

deployment means for simultaneously deploying a selected number of probes from the satellite, such that the satellite remains dynamically balanced after deployment; and communication means disposed on the communication satellite for providing communications between an Earth station and each of the plurality of probes subsequent to deployment, wherein the satellite is caused to cruise toward a selected planet after separation from the launch vehicle, and wherein at a predetermined location relative to the planet, the deployment means simultaneously deploys a selected pair of probes along opposite flight paths from the satellite toward the planet, which probes land at predetermined locations on the planet, and wherein the satellite further comprises means for injecting the satellite into a predetermined orbit around the planet.

2. A system for deploying multiple probes to a surface of a planet and for gathering data derived from scientific instruments disposed on each of the probes, said system comprising:

a launch vehicle;

a spin stabilized communications satellite;

a probe deployment means coupled to the satellite that is disposed between the satellite and the launch vehicle;

a plurality of probes containing scientific instruments and communication apparatus symmetrically disposed on the probe deployment means, and wherein oppositely disposed pairs of probes have substantially the same mass;

means for separating the satellite, deployment means and plurality of probes from the launch vehicle to cause them to cruise toward the planet;

means for orienting the spin axis of the satellite toward a predetermined location on the surface of the planet, which location substantially defines a point midway between desired landing locations of a selected pair of probes;

means for simultaneously deploying the selected pair of probes along opposite flight paths from the satellite toward the surface of the planet;

means for injecting the satellite into a predetermined orbit around the planet; and communication means disposed on the communication satellite for providing communications between an Earth station and each of the plurality of probes.

3. A method for deploying and communicating with multiple probes, said method comprising the steps of:

providing a spin-stabilized communications satellite comprising communication apparatus;

disposing a support and deployment means on the satellite;

symmetrically disposing a plurality of probes having communication apparatus on the support and deployment means, wherein symmetrically disposed probes have substantially the same mass;

providing a launch vehicle;

disposing the satellite, the support and deployment means, and the probes on the launch vehicle;

launching the launch vehicle containing the satellite, the support and deployment means and the plurality of probes;

separating the satellite, support and deployment means and plurality of probes from the launch vehicle;

at a predetermined time, orienting the satellite in a predetermined direction;

simultaneously deploying a selected number of probes from the support and deployment means such that the satellite remains dynamically balanced after deployment;

communicating between the plurality of deployed probes and an Earth station by way of their respective communication apparatus such that the satellite provides a communications link therebetween;

maneuvering the satellite to change its aim point for deploying additional probes;

deploying additional probes from the satellite such that the satellite remains dynamically balanced after deployment; and jettisoning the support and deployment means from the satellite once all probes are deployed.

4. The method of claim 3 wherein the probes are deployed to the surface of a planet and wherein the method further comprises the step of:

injecting the satellite into a predetermined orbit around a planet.

5. The method of claim 4 wherein the step of simultaneously deploying a selected number of probes comprises the steps of:

symmetrically disposing a plurality of probes on the probe deployment means, wherein oppositely disposed pairs of probes have substantially the same mass, and simultaneously deploying the selected pair of probes along opposite flight paths from the satellite toward the surface of the planet, the selected pair of probes landing at opposite ends of a line passing through the location at which the spin axis of the satellite is pointed;

and wherein the step of orienting the satellite in a predetermined direction comprises the step of orienting a spin axis of the satellite toward a predetermined location on the surface of the planet, which location substantially defines a point midway between desired landing locations of a selected pair of probes.

6. A system for deploying multiple probes, said system comprising:

a launch vehicle;

a spin stabilized communications satellite;

probe carrying means disposed between the satellite and the launch vehicle;

a plurality of probes disposed on the probe carrying means, wherein symmetrically disposed probes have substantially the same mass;

separation means coupled to the probe carrying means for separating the satellite, the probe carrying means and the plurality of probes from the launch vehicle;

targeting means for orienting the spin axis of the satellite in a predetermined direction;

deployment means for simultaneously deploying a selected number of probes from the satellite, such that the satellite remains dynamically balanced after deployment; and communication means disposed on the communication satellite for providing communications between an Earth station and each of the plurality of probes subsequent to deployment, wherein the satellite is caused to cruise toward a selected planet after separation from the launch vehicle, and wherein the satellite further comprises means for injecting the satellite into a predetermined orbit around the planet.

7. A method for deploying and communicating with multiple probes, said method comprising the steps of:

providing a spin-stabilized communications satellite comprising communication apparatus;

disposing a support and deployment means on the satellite;

symmetrically disposing a plurality of probes having communication apparatus on the support and deployment means, wherein symmetrically disposed probes have substantially the same mass;

providing a launch vehicle;

disposing the satellite, the support and deployment means, and the probes on the launch vehicle;

launching the launch vehicle containing the satellite, the support and deployment means and the plurality of probes;

separating the satellite, support and deployment means and plurality of probes from the launch vehicle;

at a predetermined time, orienting the satellite in a predetermined direction by orienting a spin axis of the satellite toward a predetermined location on the surface of the planet, which location substantially defines a point midway between desired landing locations of a selected pair of probes;

simultaneously deploying a selected number of probes from the support and deployment means such that the satellite remains dynamically balanced after deployment comprising simultaneously deploying the selected pair of probes along opposite flight paths from the satellite toward the surface of the planet, which probes are adapted to land at opposite ends of a line passing through the location at which the spin axis of the satellite is pointed;

maneuvering the satellite to change its aim point for deploying additional probes;

deploying additional probes from the satellite to the surface of a planet such that the satellite remains dynamically balanced after deployment;

jettisoning the support and deployment means from the satellite once all probes are deployed injecting the satellite into a predetermined orbit around the planet;

communicating between the plurality of deployed probes and an Earth station by way of their respective communication apparatus such that the satellite provides a communications link therebetween.

* * * * *